United States Patent [19]
Kikuta

[11] Patent Number: 5,453,182
[45] Date of Patent: Sep. 26, 1995

[54] FILTER FOR AQUARIUM APPARATUS

[75] Inventor: Toshiki Kikuta, Tokyo, Japan

[73] Assignee: Nisso Industry Co., Ltd., Tokyo, Japan

[21] Appl. No.: 216,309

[22] Filed: Mar. 23, 1994

[30] Foreign Application Priority Data

Mar. 24, 1993 [JP] Japan ................... 5-019103 U

[51] Int. Cl.⁶ ................................ A01K 63/04
[52] U.S. Cl. ............ 210/169; 210/121; 210/151; 210/416.2; 210/456; 119/259; 119/260
[58] Field of Search ................. 210/150, 151, 210/169, 416.2, 456; 119/259, 260, 261

[56] References Cited

U.S. PATENT DOCUMENTS

| | | | |
|---|---|---|---|
| 3,468,288 | 9/1969 | Cassill | 210/169 |
| 3,638,795 | 2/1972 | Feddern et al. | 210/169 |
| 3,768,652 | 10/1973 | Jardim | 210/169 |
| 3,848,567 | 11/1974 | Garber, Jr. | 210/169 |
| 3,994,807 | 11/1976 | Macklem | 210/169 |
| 4,151,810 | 5/1979 | Wiggins | 210/169 |
| 5,062,950 | 11/1991 | Shieh | 210/169 |
| 5,160,622 | 11/1992 | Gunderson et al. | 210/169 |

FOREIGN PATENT DOCUMENTS

| | | |
|---|---|---|
| 2215229 | 9/1989 | United Kingdom . |
| 2248558 | 4/1992 | United Kingdom . |

Primary Examiner—Robert A. Dawson
Assistant Examiner—Robert James Popovics
Attorney, Agent, or Firm—Oblon, Spivak, McClelland, Maier, & Neustadt

[57] ABSTRACT

A filter for an aquarium apparatus includes a filter tank casing, a filter unit accommodated in the filter tank casing for filtering water from a tank and returning filtered water thereto, a water pool section for collecting water from the tank and supplying water overflowing therefrom directly to a filter material of the filter unit. The filter unit physically and biologically filters water from the tank and returns filtered water thereto.

1 Claim, 5 Drawing Sheets

FILTER FOR AQUARIUM APPARATUS

BACKGROUND OF THE INVENTION

1. Field of the Invention

This invention relates to a filter for an aquarium apparatus for keeping and displaying tropical fish or the like.

2. Description of the Prior Art

An aquarium apparatus consists of a tank, a lid, an illuminator, a filter, etc.

Of these components, the filter serves to physically and biologically filter out contaminants from the water contained in the tank.

The filter and illuminator are designed to constitute a lid covering the open top of the tank.

In the filter, water pumped from the tank with a pump mechanism is showered from a shower pipe or a trough onto a filter material provided in a filter unit accommodated in a filter tank casing.

The filter unit is configured to concurrently perform physical filtering for filtering out floating particles in the water using chemical fibers or other such filter material and biological filtering for filtering out organic substances dissolved in the water using bacteria living in a filter material such as gravel.

In the prior art filter for the aquarium apparatus, water is supplied to a filter unit by showering. This has the advantage of increasing the amount of dissolved oxygen available to the fish or the like in the aquarium tank.

However, showering also has the effect of reducing the amount of dissolved carbon dioxide available to aquatic plants in the aquarium tank.

This method of supplying water is therefore inappropriate for the filter of an aquarium apparatus used mainly to display aquatic plants.

Moreover, since the filter unit is configured to concurrently perform physical filtering and biological filtering, the biological filtering function is curtailed along with the physical filtering function when the filter material is removed for replacement after becoming clogged. It therefore becomes impossible to maintain satisfactory water quality through biological filtering even though the biological filtering function has not been reduced.

The object of the present invention is to preclude the above inconvenience by providing a filter for an aquarium apparatus which can be used irrespective of whether the apparatus is used to display fish or aquatic plants and which enables the biological filtering function to maintain satisfactory water quality even when the physical filtering function is not in effect.

SUMMARY OF THE INVENTION

According to the invention, there is provided a filter for an aquarium apparatus comprising a filter tank casing and a filter unit accommodated therein for filtering water from a tank and returning filtered water thereto, the filter further comprising a water pool section for collecting water from the tank and supplying water overflowing therefrom directly to a filter material of the filter unit, and provided also is a filter for an aquarium apparatus comprising a filter unit for physically and biologically filtering water from a tank and returning filtered water thereto, the filter unit being divided into a first filter subunit for physically filtering water from the tank and a second filter subunit for biologically filtering water supplied from the first filter subunit.

In the filter for an aquarium apparatus according to the invention, when water overflowing from the water pool section is supplied directly to the filter material, no showering effect is produced and thus the dissolved carbon dioxide content is not reduced.

When the water overflowing from the water pool section is supplied via a trough to the filter material, a showering effect is produced to increase the dissolved oxygen content.

Further, since the filter unit is divided into the first filter subunit having the physical filtering function and the second filter subunit having the biological filtering function, even in the event that the physical filtering in the first filter subunit ceases to function, the biological filtering function in the second filter subunit can be maintained.

The above and other features of the invention will become apparent from the following description made with reference to the accompanying drawings.

DESCRIPTION OF THE PREFERRED EMBODIMENT

An embodiment of the invention will now be described with reference to FIG. 1 to FIG. 5.

Figure 1:
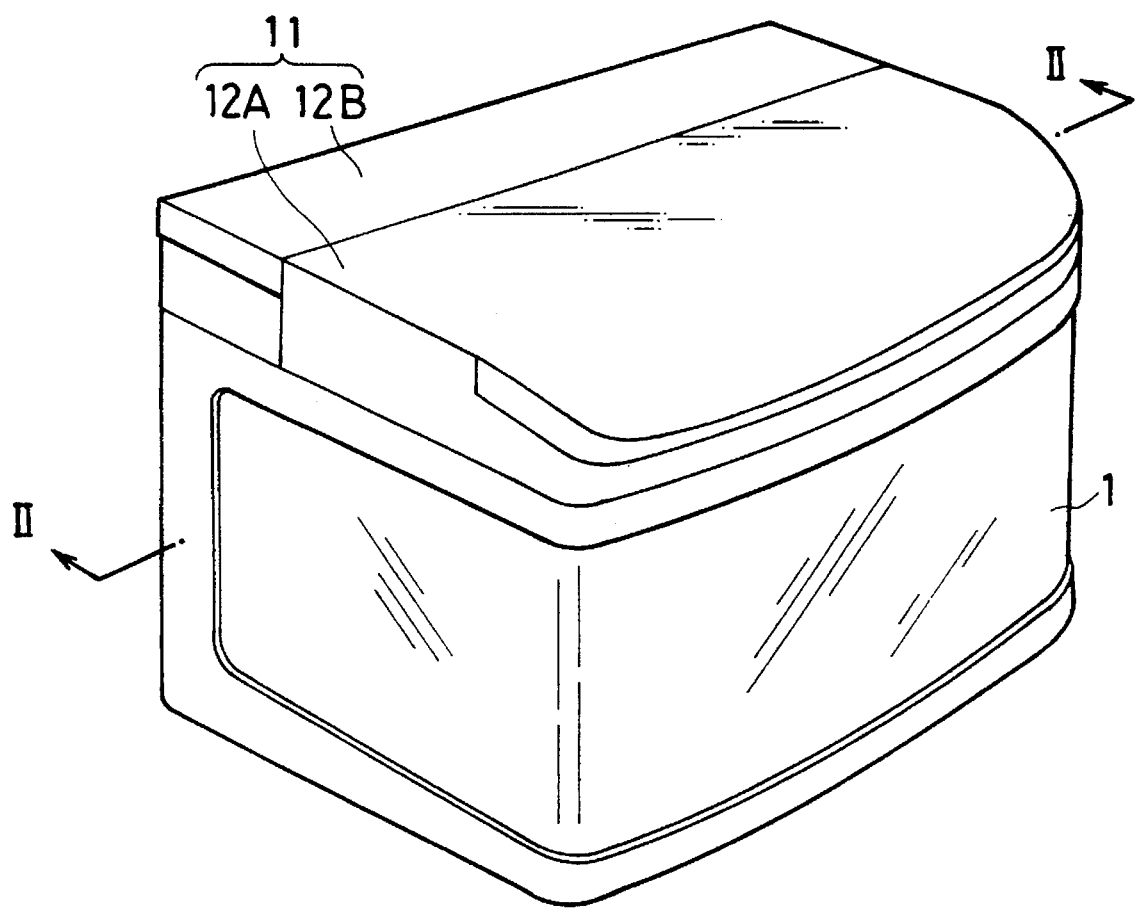
FIG. 1 is a perspective view showing an aquarium apparatus incorporating an embodiment of the filter for an aquarium apparatus according to the invention.

FIG. 1 is a perspective view showing an aquarium apparatus incorporating an embodiment of the filter for an aquarium apparatus according to the invention.

Referring to FIG. 1, reference numeral 1 designates a tank open at the top, and 11 designates a lid covering the open top of the tank 1. The lid 11 includes an illuminator 12A equipped on its underside with fluorescent lamps for illuminating the tank 1 and a filter 12B for filtering the water in the tank 1.

The illuminator 12A is disposed so as to cover the front part of the top of the tank 1, while the filter 12B is disposed to cover the rear part of the top of the tank 1.

The filter 12B comprises a filter tank casing 13B set atop the tank 1, a lid 13C covering the open top of the filter tank casing 13B, a pump mechanism 20 accommodated in part of the filter tank casing 13B, a first filter subunit 30 occupying most of the filter tank casing 13B, and a second filter subunit 40 disposed in the tank 1 and connected to the first filter subunit 30.

An engagement member 14 is provided on the underside of the rear portion of the filter tank casing 13B. The engagement member 14 extends downward in an L-shaped sectional profile and supports a second filter casing 41 which is part of the second filter subunit 40.

The pump mechanism 20 includes a motor 21 accommodated in the filter tank casing 13B, a first cylindrical member 22 extending from a motor 21 into the tank 1, an intermediate frame 23 provided at the lower end of the first cylindrical member 22 and accommodating a vane (not shown), a second cylindrical member 24 extending downward from the intermediate frame 23, a strainer 25 mounted on the lower end of the second cylindrical member 24, and a delivery pipe 26 extending from the intermediate frame 23 into the filter tank casing 13B and having a U-shaped end portion.

The first filter subunit 30 includes a first filter casing 31 with a partitioning wall 31w defining a water pool section 31p for collecting water from the delivery pipe 26, a bottom member 32 placed on the bottom of the first filter casing 31, a first filter material 33 for physical filtering accommodated in a space defined by a vertical portion 32h of the bottom member 32 and the partitioning wall 31w, and a trough 34 having one end engaged with the partitioning wall 31w and the other end supported by support pins 32p projecting from the bottom member 32.

The bottom of the first filter casing 31 has discharge ports 31ha and 31hb, and the bottom of the bottom member 32 has a plurality of thin slits 32s. A flow path is therefore formed between the two components when the bottom member 32 is placed on the bottom of the first filter casing 31.

The trough 34 is supported to be higher on the side of the partitioning wall 31w and lower on the side of the support pins 32p so that water will flow along the trough 34 from the side of the partitioning wall 31w to the side of the support pins 32p. The bottom of the trough 34 is flat and has a large number of projection-hole sets each consisting of a projection 34i and a hole 34h. In each set, the projection 34i is on the upstream side and the hole 34h is formed adjacent the downstream side of the projection 34i and has the same width as the projection 34i. Water overflowing from the water pool section 31p passes through the holes 34h to the first filter material 33.

Floats 35A and 35B are disposed opposite the discharge ports 31ha and 31hb, and a drain pipe 36 is connected to the discharge port 31ha. Water is returned through the drain pipe 31h into the tank 1.

The second filter subunit 40 includes the second filter casing 41 shaped like an openable and closable box and a plurality of buckets 42 accommodating a plurality of second filter materials such that these materials will not be mixed.

The second filter casing 41 is provided at its top with an L-shaped engagement piece 41f and is detachably supported on the first filter casing 31 by engagement of the engagement piece 41f with the engagement member 14. An inlet provided at the top of the second filter casing 41 communicates with the discharge port 31hb via a connecting pipe 43.

Water from the discharge port 31hb first flows down to the lower end of the second filter casing 41 and then rises. As it rises, it filters through the second filter materials accommodated as biological filtering materials in the buckets 42 before being returned to the tank 1 through a discharge port 41h provided in the top front of the bucket.

The filtering operation will now be described.

When the motor 21 is operated, water is drawn through the strainer 25 and supplied through the second cylindrical member 24, the intermediate frame 23 and the delivery pipe 26 to the water pool section 31p.

Water overflowing from the water pool section 31p flows along the trough 34. At this time, large particles which are caught and removed by the projections 34i. The water freed of large particles is supplied in a showering fashion from the holes 34h onto the first filter material 33.

When water is supplied in this way, it dissolves oxygen owing to the showering effect. Thus, the dissolved oxygen content is increased.

The water that has been physically filtered through the first filter material 33, is collected in the first filter casing 31 and 70 to 80% of it is returned through the discharge port 31ha and the drain pipe 36 to the tank 1, while 20 to 30% of it is supplied through the discharge port 31hb into the second filter casing 41.

The water thus supplied to the second filter casing 4 is biologically filtered through the second filter materials in the buckets 42 and then returned through the discharge port 41h to the tank 1.

The amount of water supplied to the second filter casing 41 is limited to 20 to 30% so that the biological filtering can proceed slowly and effectively and also so that the overall size and thickness of the second filter casing 41 can be reduced so as to secure a large space for keeping fish and/or plants in the tank 1.

As shown above, in this embodiment of the invention water is first filtered physically in the first filter subunit 30 and then filtered biologically in the second filter subunit 40. Thus, even when the first filter material in the first filter subunit 30 clogs and is removed for replacement, the second filter subunit 40 continues to function, so that satisfactory water quality can be maintained by biological filtering through the second filter subunit.

Further, since the second filter susbunit 40 is disposed in the tank 1, it will not wet the area surrounding the aquarium apparatus.

Further, since the floats 35A and 35B are disposed to cover the discharge ports 31ha and 31hb, the gurgling sound produced by water flowing down through the discharge ports 31ha and 31hb can be muffled.

Figure 2:
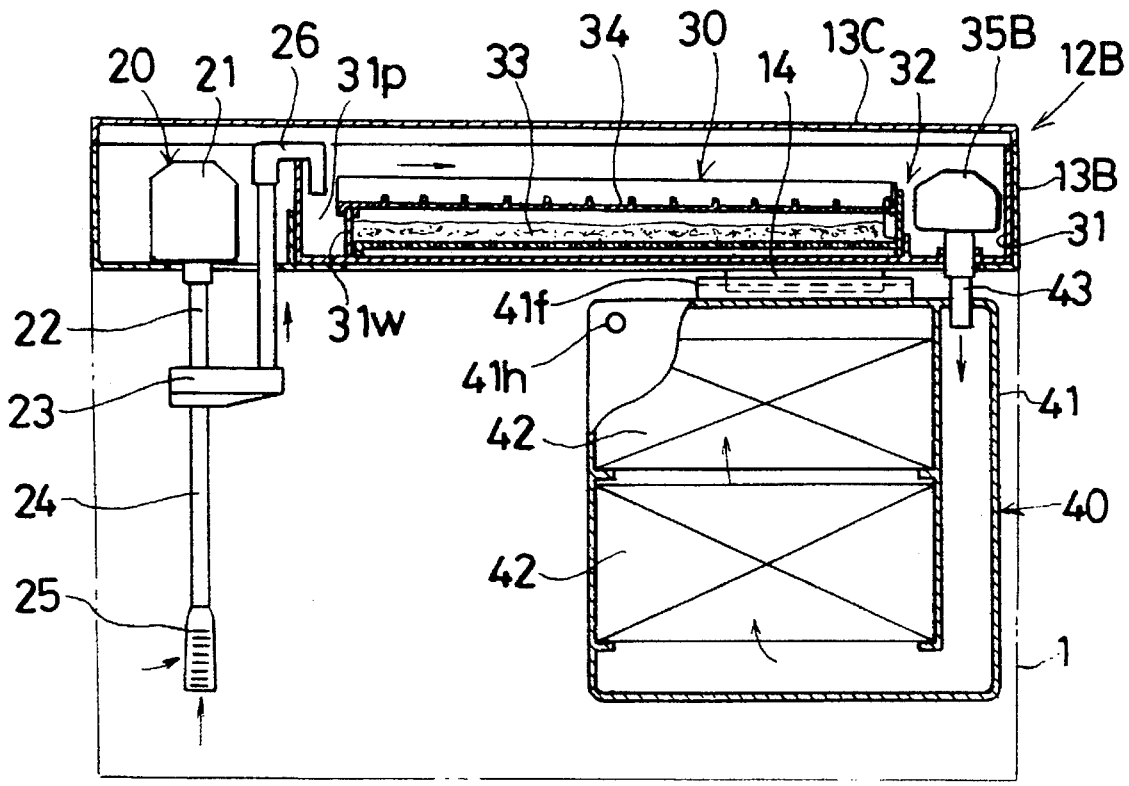
FIG. 2 is a sectional view taken along line II—II in FIG. 1.
Figure 3:
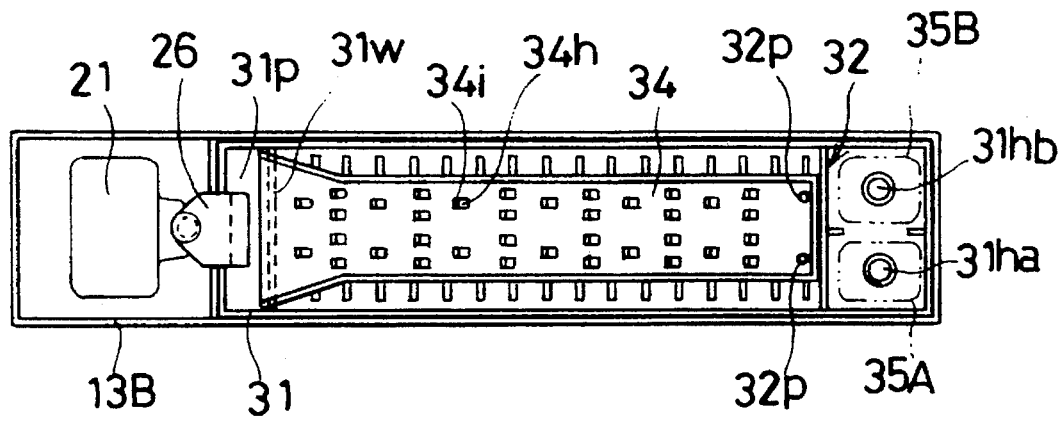
FIG. 3 is a plan view showing a first filter subunit with its lid removed.
Figure 4:
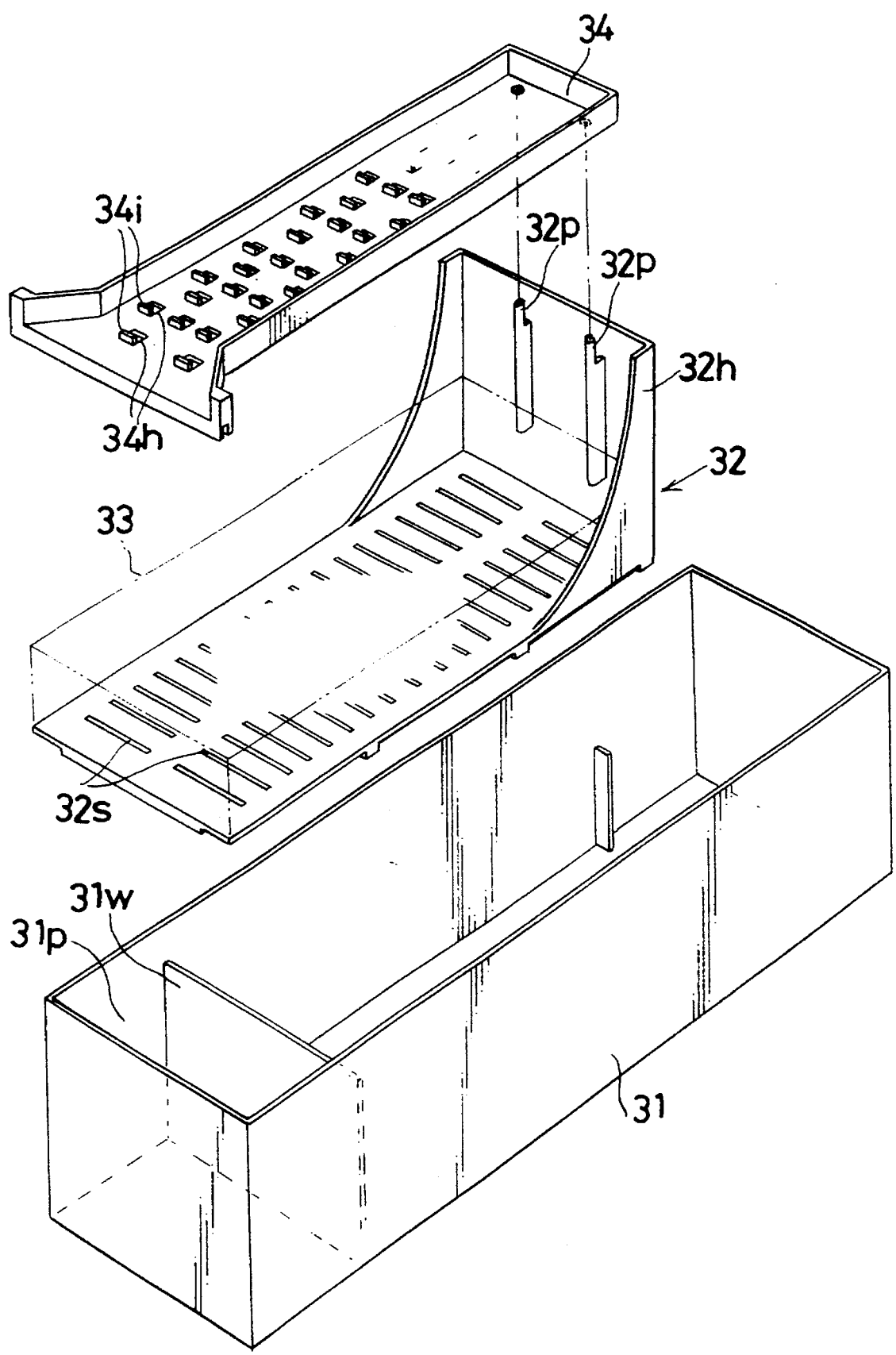
FIG. 4 is an exploded perspective view showing essential elements of the first filter subunit.
Figure 5:
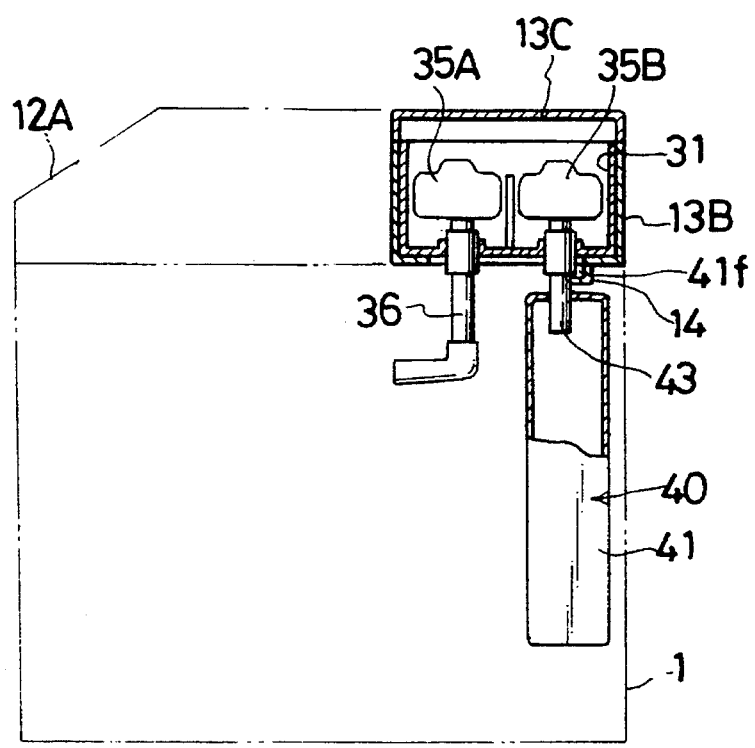
FIG. 5 is a sectional view showing how first and second filter subunits are interconnected.
Figure 6:
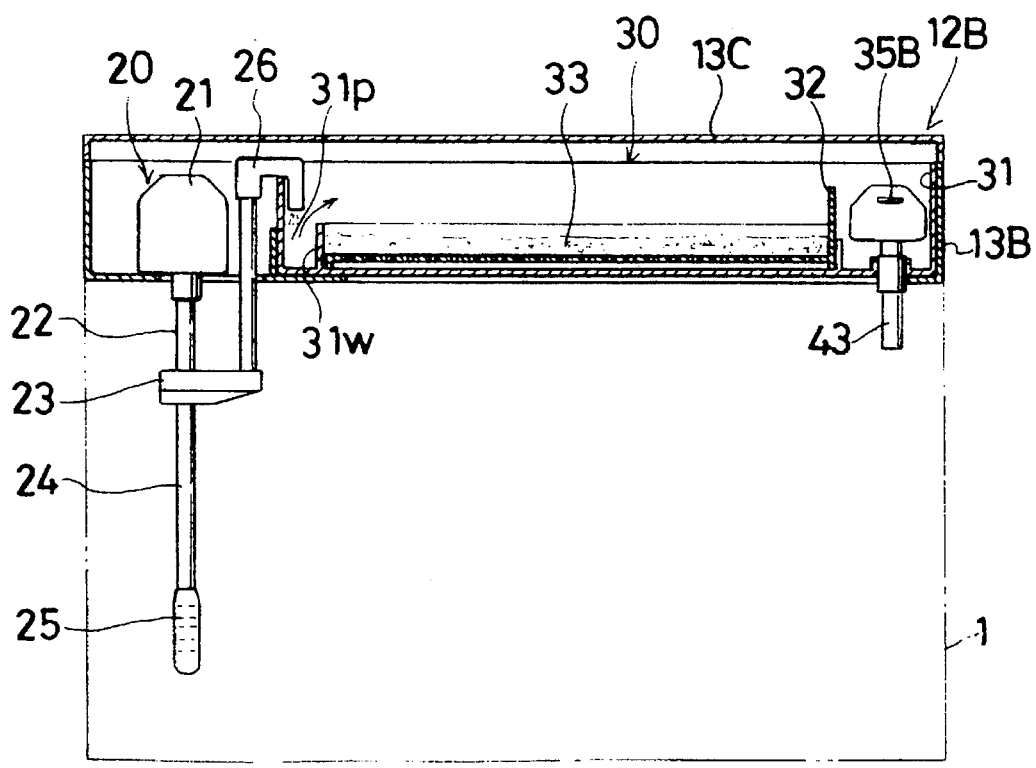
FIG. 6 is a sectional view showing an aquarium apparatus incorporating a different embodiment of the filter for an aquarium apparatus according to the invention.

FIG. 6 is an explanatory view similar to that of FIG. 2 showing an aquarium apparatus incorporating a different embodiment of the filter for an aquarium apparatus according to the invention.

The second filter subunit 40 has been omitted from FIG. 2.

In this embodiment, the trough 34 is not used. Thus, water overflowing from the water pool section 31p is supplied directly to the first filter material 33.

When water is supplied to the first filter material 33 in this way, no showering effect is produced. Thus, there is neither an increase in the dissolved oxygen content nor a reduction in the dissolved carbon dioxide content.

Further, since the floats 35A and 35B are disposed to cover the discharge ports 31ha and 31hb, no increase in dissolved oxygen content increase or reduction in dissolved carbon dioxide content takes place in these zones.

Since no reduction in the dissolved carbon dioxide content occurs when the trough 34 is not used, this structure is suitable for an aquarium apparatus used mainly to display aquatic plants.

Figure 7:
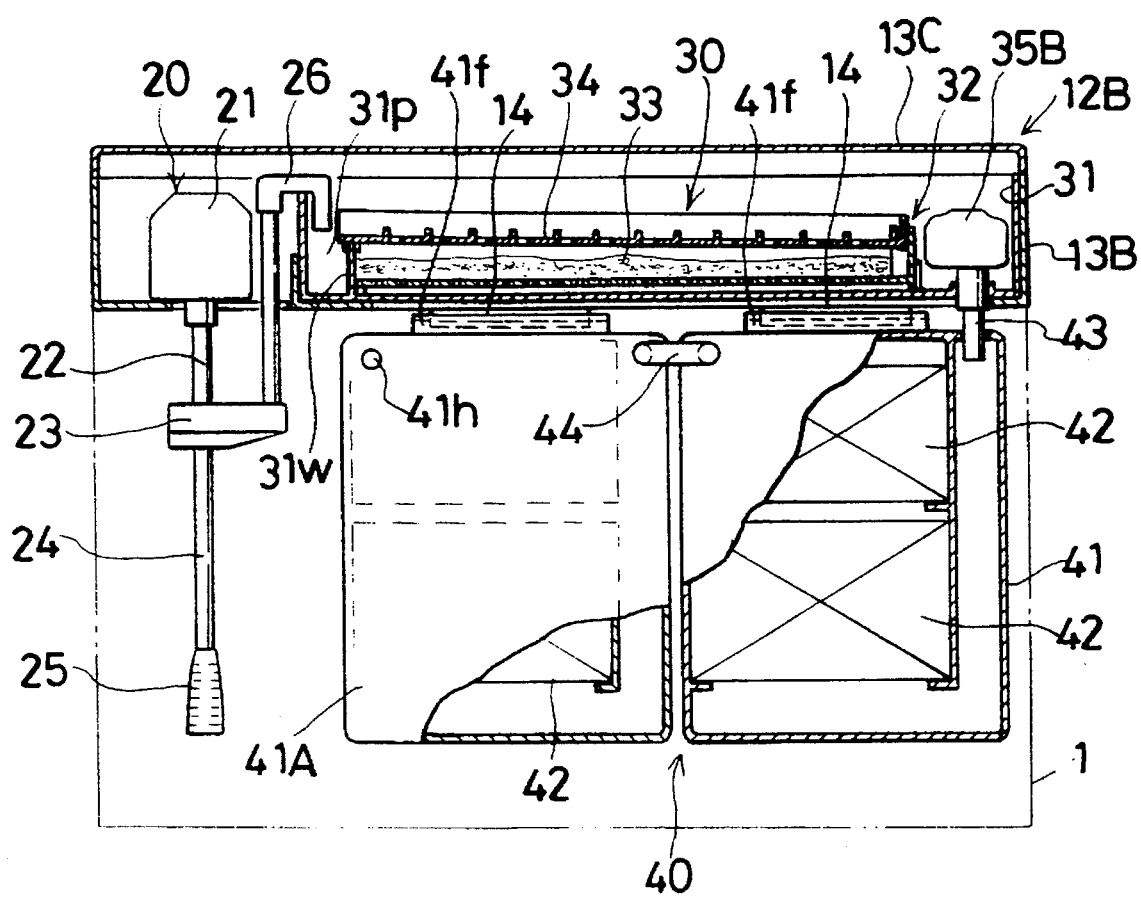
FIG. 7 is a partially broken away sectional view showing an aquarium apparatus incorporating a further embodiment of the filter for an aquarium apparatus according to the invention.

FIG. 7 is an explanatory view similar to FIG. 2 showing an aquarium apparatus incorporating a further embodiment of the filter for an aquarium apparatus.

In this embodiment, the second filter subunit 40 has second casings 41 and 41A connected to each other by a connecting pipe 44 so that water flows from the second casing 41 to the second casing 41A. Thus, a pronounced biological filtering effect is obtainable.

While the above embodiments relate to the case in which the projections 34i are provided on the upstream side and the holes 34b on the downstream side, the projections 34i may be provided on the downstream side and the hole 34h on the upstream side. This arrangement can produce substantially the same effect.

Further, while it was described that a part of the water is returned from the first filter subunit 30 to the tank 1, insofar as sufficient biological filtering in the second filter subunit can be ensured it is instead possible to use an arrangement in which all of the water in the first filter subunit is supplied to the second filter subunit.

Further, while the filter unit was described as being divided into the first and second filter subunits 30 and 40, it is possible to accommodate both the first and second filter subunits in the filter tank casing.

As has been described in the foregoing, according to the invention the filter tank casing is provided with the water pool section from which overflow water is supplied to the filter unit or the first filter subunit thereof either directly or by showering from a trough. In the case of not using any trough, the dissolved carbon dioxide content is not reduced, and thus the structure may be employed as a filter for an aquarium apparatus mainly for displaying aquatic plants. In the case of using the trough, on the other hand, the dissolved oxygen content can be increased, and thus the structure can be employed as a filter for an aquarium apparatus mainly for displaying fish.

Further, since the filter unit is divided into the first filter subunit for physical filtering and the second filter subunit for biological filtering, even when the filter material is removed from the first filter subunit for replacement, the biological filtering through the second filter subunit still functions to maintain satisfactory water quality.

Moreover, since the second filter subunit is disposed in the tank, it will not wet the area surrounding the aquarium apparatus.

What is claimed is:

1. A filter apparatus for filtering water contained in an aquarium, said filter comprising:

a filter tank casing having a filter material therein for placement atop the aquarium, said filter tank having an upstream end with a water pool section, and a downstream end having discharge ports;

a pump having an inlet for pumping the aquarium water up to said filter tank, and an outlet delivering the water to said water pool section; and a detachable trough having a plurality of projection-hole sets, each consisting of a projection and a hole with each hole being formed adjacent the downstream side of its respective projection, said trough being attached to an upper portion of said filter tank and positioned in said tank such that water overflows from said water pool section onto said trough through said holes to said filter material and then through said discharge ports.

* * * * *